United States Patent
Graeve et al.

(10) Patent No.: US 8,517,359 B2
(45) Date of Patent: Aug. 27, 2013

(54) HYDRAULIC DAMPING MOUNT

(75) Inventors: Arndt Graeve, Koblenz (DE); Henry Winter, Steinebach (DE); Ulrich Mews, Höhr-Grenzhausen (DE); Eric Eisel, Ellenhausen (DE)

(73) Assignee: Trelleborg Automotive Germany GmbH, Hoehr-Grenzhausen (DE)

( * ) Notice: Subject to any disclaimer, the term of this patent is extended or adjusted under 35 U.S.C. 154(b) by 37 days.

(21) Appl. No.: 12/542,000

(22) Filed: Aug. 17, 2009

(65) Prior Publication Data

US 2009/0302515 A1   Dec. 10, 2009

Related U.S. Application Data

(63) Continuation of application No. PCT/EP2008/051750, filed on Feb. 13, 2008.

(30) Foreign Application Priority Data

Feb. 16, 2007  (DE) .......................... 10 2007 007 857

(51) Int. Cl.
*F16F 5/00* (2006.01)
*F16M 13/00* (2006.01)
(52) U.S. Cl.
USPC ............. 267/140.13; 267/140.14; 267/140.15
(58) Field of Classification Search
USPC ............. 267/140.12, 140.13, 140.14, 140.15, 267/136; 248/562, 636
See application file for complete search history.

(56) References Cited

U.S. PATENT DOCUMENTS

| | | | |
|---|---|---|---|
| 4,773,634 A * | 9/1988 | Hamaekers ................... 267/219 |
| 4,886,252 A | 12/1989 | Haussermann | |
| 5,167,403 A * | 12/1992 | Muramatsu et al. ...... 267/140.13 |
| 5,462,261 A * | 10/1995 | Eckel et al. .............. 267/140.13 |
| 6,361,031 B1 * | 3/2002 | Shores et al. ............. 267/140.14 |
| 6,439,554 B1 * | 8/2002 | Takashima et al. ....... 267/140.13 |
| 6,619,636 B2 * | 9/2003 | Yamamoto et al. ....... 267/140.13 |
| 6,808,167 B2 * | 10/2004 | Kodama .................... 267/140.13 |
| 2003/0098533 A1 | 5/2003 | Nishi et al. | |

FOREIGN PATENT DOCUMENTS

| | | |
|---|---|---|
| DE | 3805761 A1 | 9/1989 |
| DE | 10104458 A1 | 9/2002 |
| DE | 10332081 A1 | 3/2005 |
| EP | 0939243 A2 | 9/1999 |
| FR | 2868822 A1 | 10/2005 |
| JP | 2005207530 A | 8/2005 |

OTHER PUBLICATIONS

International Search Report dated Apr. 4, 2008.

* cited by examiner

*Primary Examiner* — Melody Burch
(74) *Attorney, Agent, or Firm* — Laurence A. Greenberg; Werner H. Stemer; Ralph E. Locher

(57) ABSTRACT

A hydraulic damping mount has a working chamber and a compensating chamber, which are filled with a hydraulic liquid and separated from each other by an intermediate plate. The working chamber and the compensating chamber are connected to each other via a transfer passage and a bypass channel. The bypass channel can be opened or closed by an actuator. The actuator is configured as a one-piece elastomer part, which has a fastening portion on the edge and an actuating element, which is connected to the fastening portion via a flexible connecting portion.

10 Claims, 3 Drawing Sheets

HYDRAULIC DAMPING MOUNT

CROSS-REFERENCE TO RELATED APPLICATION

This is a continuation, under 35 U.S.C. §120, of copending international application No. PCT/EP2008/051750, filed Feb. 13, 2008, which designated the United States; this application also claims the priority, under 35 U.S.C. §119, of German patent application No. DE 10 2007 007 857.0, filed Feb. 16, 2007; the prior applications are herewith incorporated by reference in their entirety.

BACKGROUND OF THE INVENTION

Field of the Invention

The present invention relates to a hydraulic damping mount with a working chamber and a compensating chamber, which are filled with a hydraulic liquid and are separated from each other by an intermediate plate. The working chamber and the compensating chamber are connected to each other by a transfer passage and a bypass channel, wherein the bypass channel can be opened or closed by an actuator.

Such a mount is known from published, non-prosecuted German patent application DE 103 32 081 A1. The actuator centrally arranged in the intermediate plate has a sliding sleeve in the form of a hollow cylinder, which is pressed by a return spring against a baffle plate when no vacuum is applied, whereby an opening in the baffle plate is closed. By applying a vacuum the opening in the baffle plate is opened. The actuator used has a multipart and thus complicated structure.

SUMMARY OF THE INVENTION

It is accordingly an object of the invention to provide a hydraulic damping mount that overcomes the above-mentioned disadvantages of the devices of this general type, in which the actuator has a simple structure and is therefore inexpensive to manufacture.

With the forgoing and other objects in view there is provided, in accordance with the invention, a hydraulic damping mount. The hydraulic damping mount contains an intermediate plate, a working chamber, a transfer passage, a bypass channel, and a compensating chamber. The working chamber and the compensating chamber are filled with a hydraulic liquid and are separated from each other by the intermediate plate. The working chamber and the compensating chamber are connected to each other by the transfer passage and by the bypass channel. A baffle plate is provided and has an opening that leads to the compensating chamber. An actuator is provided for opening and closing the bypass channel. The actuator has an actuating element, which, in an assembled state, abuts with a biasing force against the baffle plate. The bypass channel is disposed offset with respect to the actuator in a radial direction such that the actuating element has a lateral pressure applied to it. The actuator is formed as a one piece elastomer part having a flexible connecting portion and a fastening portion in an edge region. The actuating element is connected to the fastening portion via the flexible connecting portion, wherein a biasing of the actuator is achieved due to a shape and flexibility of the connecting portion of the actuator.

To solve this object, in a hydraulically damping mount of the initially mentioned type, it is suggested that the actuator is formed as a one-piece elastomer part which has a fastening portion on the edge and an actuating element, which is connected to the fastening portion via a flexible connecting portion.

In the mount according to the present invention, the actuator can be inexpensively manufactured, since it is formed as a one-piece elastomer part. Furthermore, such an actuator is distinguished by little wear and thus by a long useful life. Furthermore, the one-piece elastomer part is self-damping and thus prevents self-resonances, whereby the generation of noise is substantially suppressed.

Advantageously, in the assembled state, the actuating element of the actuator abuts with a biasing force against a baffle plate, which has an opening to the compensating chamber.

Advantageously, the biasing of the actuator is achieved by the shape and flexibility of the connecting portion of the actuator.

In a further advantageous embodiment, the bypass channel is offset with respect to the actuator in the radial direction in such a way that the actuating element has a lateral pressure applied to it. The working direction of the actuator is thus vertical to the flow direction. This is how the closing forces of the actuator can be kept relatively small.

Advantageously, the actuator has a rotation-symmetrical shape. This is how excellent sealing is achieved without special measures.

The actuating element of the actuator is preferably cylindrically formed.

In a further embodiment, it is provided that, in the fastening portion, a reinforcing element, in particular of metal, is inserted.

Advantageously, the top surface of the actuator has a recess formed into it, which forms a vacuum chamber in the assembled state of the actuator.

Advantageously, the vacuum chamber is connectable to a controllable vacuum source.

In a further embodiment, in the intermediate plate, a decoupling chamber is provided in which a decoupling membrane is accommodated.

To achieve switchability of the decoupling membrane, the decoupling membrane is associated with a vacuum chamber connected to a controllable vacuum source.

In an advantageous embodiment, it is provided that the actuator and the decoupling membrane are simultaneously switchable.

Advantageously, the opening in the baffle plate is provided with a grid. Introduction of the actuating element of the actuator into the opening of the baffle plate is thus avoided.

Other features which are considered as characteristic for the invention are set forth in the appended claims.

Although the invention is illustrated and described herein as embodied in a hydraulic damping mount, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
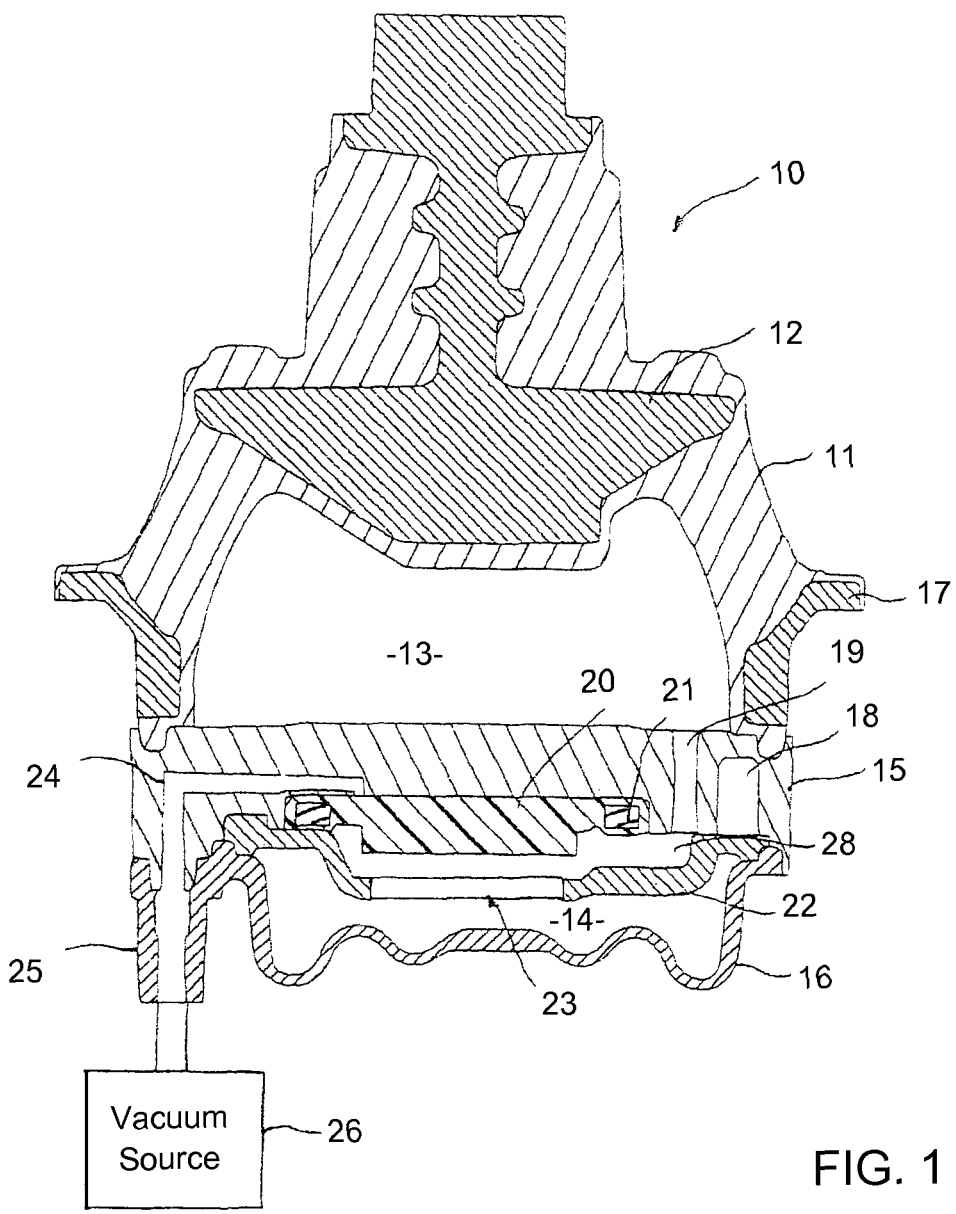
FIG. 1 is a diagrammatic, vertical sectional view of a first embodiment of a mount in a first switching position according to the invention.

Referring now to the figures of the drawing in detail and first, particularly, to FIG. 1 thereof, there is shown a hydraulically damping mount 10 used as an engine mount in motor vehicles. The mount 10 has a suspension spring 11 of elastomeric material supporting a mounting core 12 on a side of the engine. The suspension spring 11 is supported on a housing 17 on its edge, which is the boundary of the mount 10 on its outer circumference. The suspension spring 11 defines a working chamber 13 separated from a compensating chamber 14 by an intermediate plate 15. The compensating chamber 14 is delimited by a resilient compensating cap 16 of an elastomeric material.

The working chamber 13 and the compensating chamber 14 are filled with a hydraulic liquid. In the intermediate plate 15, a transfer passage 18 connecting the working chamber 13 and the compensating chamber 14 is provided which has a spiraling path. Furthermore, the working chamber 13 and the compensating chamber 14 are connected by a vertically extending bypass channel 19 which can have a plurality of segments vertically offset to each other in the circumferential direction.

On the intermediate plate 15, a baffle plate 22 is provided, which delimits a cavity 28. In the cavity 28, an actuator 20 is accommodated, which is fixed between the intermediate plate 15 and the baffle plate 22 at its fastening portion 20a on the edge. In the baffle plate 22, an opening 23 is provided, which can be opened or closed by the switchable actuator 20.

The control of the actuator 20 is carried out pneumatically by a vacuum line 24, which opens out into a vacuum port 25. The vacuum port 25 is integrally formed on compensating cap 16. The vacuum port 25 is connected to a vacuum source 26.

Figure 5:
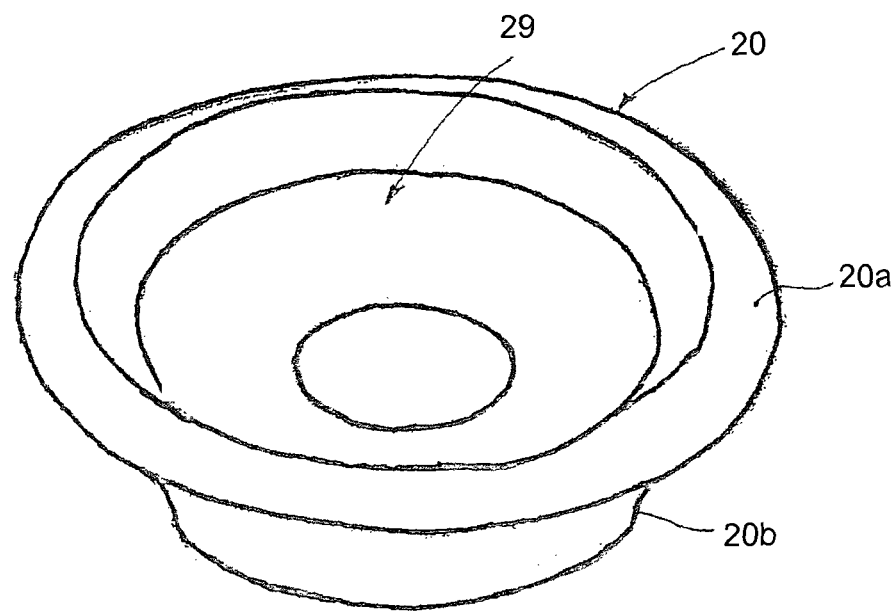
FIG. 5 is a diagrammatic, perspective view of an actuator according to the invention.

FIG. 5 shows the actuator 20 in a perspective individual view. The actuator 20 is formed as a one-piece rotation-symmetrical elastomer part. A fastening portion 20a is provided on the edge, which is cured with a reinforcing element 21 of metal in it. An actuating element 20b in the form of a cylinder is connected with the fastening portion 20a via a flexible connecting portion 20c. The actuator 20 has a recess 29 formed into it, which allows movement of the actuating element 20b in the vertical direction.

The actuator 20 can be manufactured in a simple manner as a cured rubber part. Furthermore, the actuator 20 is distinguished by little wear and tear and therefore a long useful life, to which the short actuating distances also contribute.

Figure 2:
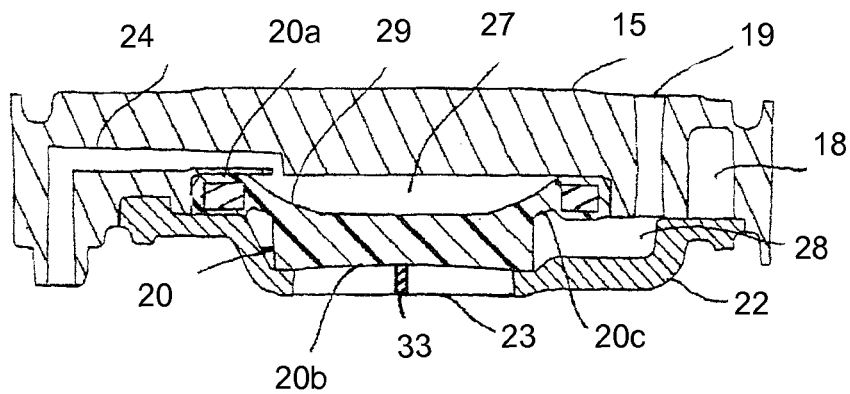
FIG. 2 is a diagrammatic, vertical sectional view of an intermediate plate of the mount shown in FIG. 1 in a second switching position of the mount.

FIG. 2 shows the actuator 20 in a closed position. In this switching position, which is present in the driving state, there is no vacuum applied. Due to this configuration, safe functioning is also ensured should the vacuum source fail. The actuator 20 is accommodated with a bias between the baffle plate 22 and the intermediate plate 15. The actuating element 20b of the actuator 20 therefore abuts against the baffle plate 22 with a biasing force, and closes opening 23. A grid 33 arranged in the opening 23 and supports the actuating element 20b and prevents introduction of the actuating element 20b into the opening 23.

As can be seen from FIGS. 1 and 2, the bypass channel 19 is arranged offset from the actuator 20 in the radial direction in such a way that the actuating element 20b of the actuator 20 has pressure applied to its side. The working direction of the actuator 20 is thus vertical to the flow direction.

The recess 29 formed in the actuator 20 forms a vacuum chamber 27 together with the intermediate plate 15. The vacuum chamber 27 is connected to the vacuum line 24. FIG. 1 shows the actuator 20 in its opening position, which is achieved by applying a vacuum to the vacuum chamber 27. Herein, the actuating element 20b of the actuator 20 is vertically upwardly displaced. The opening 23 provided in the baffle plate 22 is thus opened for the bypass channel 19. In this switching position of the actuator 20, the working chamber 13 is thus connected to the compensating chamber 14 both via the transfer channel 18 and via the bypass channel 19.

Figure 3:
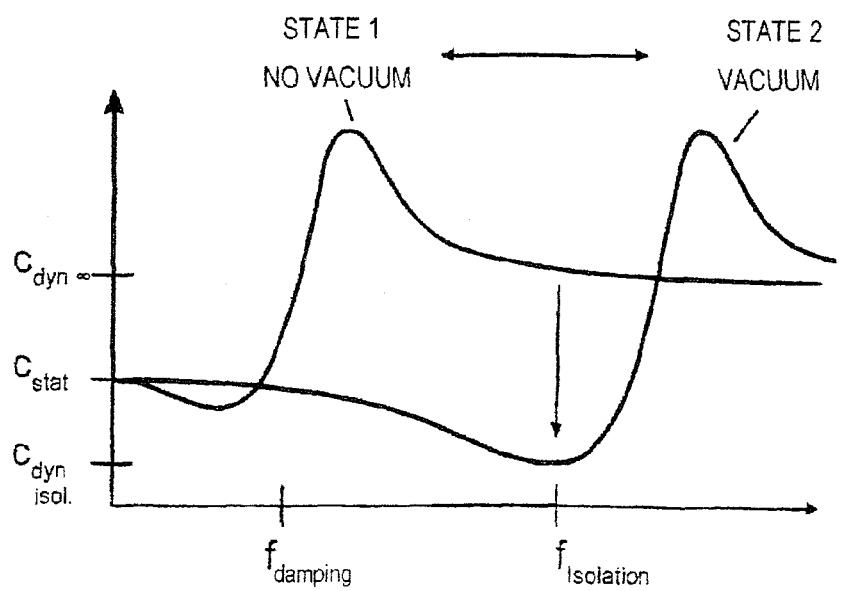
FIG. 3 is a graph showing the resulting characteristics of the mount in the two switching positions.

FIG. 3 shows the characteristics of the mount according to FIGS. 1 and 2 in the two switching positions of the actuator 20. It can be seen that the dynamic stiffness ($C_{dyn}$) can be reduced by opening the bypass channel 19, as shown in FIG. 1. The maximum of the dynamic stiffness ($C_{dyn}$) is displaced into higher frequency ranges.

Figure 4:
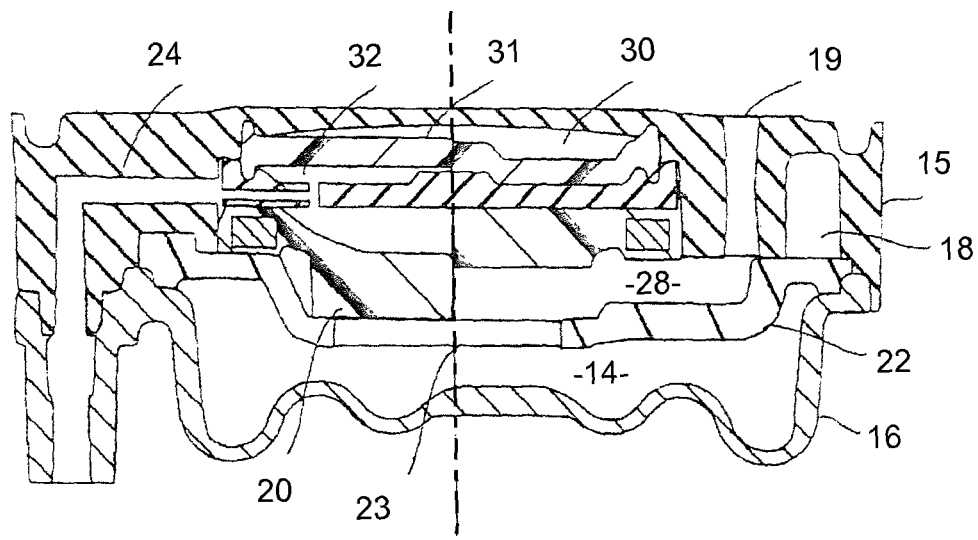
FIG. 4 is a diagrammatic, vertical sectional view of the intermediate plate in a second embodiment of the mount according to the invention.

FIG. 4 shows a second embodiment, wherein the reference numerals already introduced will be used in its description for the same or equivalent parts.

In the mount shown, the intermediate plate 15 has a decoupling chamber 30, in which a switchable decoupling membrane 31 is accommodated. The decoupling membrane 31 is of an elastomeric material and is attached to the intermediate plate 15 at its circumference. The decoupling membrane 31 has a vacuum chamber 32 associated with it, which is connected to vacuum line 24.

FIG. 4, in the left half of the figure, shows the switching position of the actuator 20 and the decoupling membrane 31 with no vacuum applied. In this switching position, the actuator 20 closes off opening 23 provided in the baffle plate 22. The bypass channel 19 is thus closed. The decoupling membrane 31 is freely moveable, whereby the decoupling effect comes about. With the application of a vacuum via vacuum line 24, the actuator 20 and the decoupling membrane 31 are displaced into the switching positions shown in the right half of the figure. Herein, the actuator abuts against the bottom of intermediate plate 15. The bypass channel 19 is thus opened. The decoupling membrane 31 is brought into contact with the bottom of decoupling chamber 30 by applying a vacuum. The decoupling is thus switched off.

The invention claimed is:

1. A hydraulic damping mount, comprising:
   an intermediate plate;
   a working chamber;
   a transfer passage;
   a bypass channel;
   a compensating chamber, said working chamber and said compensating chamber being filled with a hydraulic liquid and separated from each other by said intermediate plate, said working chamber and said compensating chamber fluidically connected to each other by said transfer passage and by said bypass channel;
   a baffle plate having an opening formed therein, said opening leading to said compensating chamber; and
   an actuator for opening and closing said bypass channel, said actuator having an actuating element, which, in an assembled state, abuts with a biasing force against said baffle plate, said bypass channel disposed offset with respect to said actuator in a radial direction such that said actuating element has a lateral pressure applied to it, said actuator formed as a one piece elastomer part having a flexible connecting portion and a fastening portion in an edge region, said actuating element being connected to said fastening portion via said flexible connecting portion, wherein a downward biasing of said actuator toward said baffle plate being achieved due to a shape and flexibility of said connecting portion of said actuator without a coil spring contributing to the biasing, said actuator having a topside with a recess formed therein, said recess forming a vacuum chamber in an assembled state of said actuator.

2. The hydraulic damping mount according to claim 1, wherein said actuator is rotation-symmetrically formed.

3. The hydraulic damping mount according to claim 1, wherein said actuating element has a form of a cylinder.

4. The hydraulic damping mount according to claim 1, further comprising a reinforcing element inserted in said fastening portion.

5. The hydraulic damping mount according to claim 4, wherein said reinforcing element is made from metal.

6. The hydraulic damping mount according to claim 1, wherein said vacuum chamber is connectable to a controllable vacuum source.

7. The hydraulic damping mount according to claim 1, further comprising:
   a decoupling chamber disposed in said intermediate plate; and
   a decoupling membrane accommodated in said decoupling chamber.

8. The hydraulic damping mount according to claim 7, wherein said decoupling membrane has a further vacuum chamber associated with it, which is connectable to a controllable vacuum source.

9. The hydraulic damping mount according to claim 7, wherein said actuator and said decoupling membrane are simultaneously switchable.

10. The hydraulic damping mount according to claim 1, further comprising a grid disposed in said opening of said baffle plate.

* * * * *